United States Patent [19]

Kita et al.

[11] Patent Number: 4,668,974
[45] Date of Patent: May 26, 1987

[54] DIGITAL SCAN CONVERTER

[75] Inventors: Hiroyuki Kita; Masaharu Tokuhara, both of Kanagawa; Hiroyuki Kawashima, Tokyo, all of Japan

[73] Assignee: Sony Corporation, Tokyo, Japan

[21] Appl. No.: 804,152

[22] Filed: Dec. 3, 1985

[30] Foreign Application Priority Data

Dec. 11, 1984 [JP] Japan ................................. 59-261617

[51] Int. Cl.$^4$ ............................................. H04N 9/64
[52] U.S. Cl. ....................................... 358/11; 358/150; 358/153
[58] Field of Search ................. 358/11, 140, 150, 153, 358/158

[56] References Cited

U.S. PATENT DOCUMENTS 4,127,873  11/1978  Katagi ................................... 358/166
4,567,521  1/1986   de la Guardia ..................... 358/150
4,623,913  11/1986  Fling ..................................... 358/11

Primary Examiner—Michael A. Masinick
Attorney, Agent, or Firm—Lewis H. Eslinger; Alvin Sinderbrand

[57] ABSTRACT

A digital scan converter having an oscillator providing a clock signal used to scan-convert an input video signal to thereby produce a scan-converted output video signal, an automatic frequency control for controlling the oscillator in synchronism with a synchronizing signal separated from the input video signal and a counter for frequency-dividing the clock signal from the oscillator to thereby form a control signal used for controlling blanking of the input video signal. The counter also provides an address signal for a memory in which the video signal is temporarily stored during the scan converting operation. Since a composite blanking pulse for the input video signal is formed in synchronism with the address signal for the memory, it is possible to prevent appearance of a jitter of the composite blanking pulse on a display screen.

8 Claims, 3 Drawing Figures

DIGITAL SCAN CONVERTER

BACKGROUND OF THE INVENTION

1. Field of the Invention

This invention relates generally to a digital scan converter suitable for use with a high definition television receiver in which the number of horizontal lines of a video signal is doubled to thereby display a picture of high definition.

2. Description of the Prior Art

In a digital scan converter, a standard composite color video signal is supplied to a luminance/chrominance (Y/C) signal processor circuit which generates standard red, green and blue analog primary color signals R,G and B. The red, green and blue analog primary color signals are supplied to an (analog-to-digital) A/D converter and thereby converted to red, green and blue digital primary color signals which are written in a memory at one speed and read therefrom at a faster speed for achieving the scan conversion by which the number of the horizontal scanning lines is doubled. The scan-converted red, green and blue digital primary color signals read from the memory are supplied to (digital-to-analog) D/A converter in which they are converted to scan-converted red, green and blue analog primary color signals. The input standard composite color video signal is also supplied to a deflection integrated circuit (IC) which generates a composite synchronizing signal and a composite blanking signal. Conventionally, the composite blanking signal is provided by an automatic frequency control (AFC) circuit incorporated in the deflection IC and is applied to the Y/C processor circuit for carrying out the blanking of the red, green and blue primary color signals generated by the Y/C processor circuit. Problems arise if the foregoing conventional arrangement for blanking the three primary color signals is employed in a digital scan converter in which a horizontal synchronizing pulse from the deflection IC is supplied to a second AFC circuit and a voltage controlled oscillator (VCO) is controlled by the output signal from the second AFC circuit to provide a clock signal supplied to a writing address counter and a reading address counter, with the address signals therefrom being supplied through a selector to the memory for controlling the writing and reading of the latter, and with the address signal from the reading address counter being further supplied to a synchronizing signal generator circuit which generates a horizontal synchronizing pulse synchronized with the reading address counter and supplied to the second AFC circuit. Thus, the input video signal and the address signal are synchronized with each other. However, the AFC circuit incorporated in the deflection IC for providing the composite blanking signal and the second AFC for controlling the VCO are not synchronized with each other. As a result of the foregoing, jitter components of the two AFC circuits may appear to be multiplied with each other. In that case, the blanking periods of the red, green and blue primary color signals will overlap the writing address periods of the memory so that the blanking period will appear as a black area at the left end or right end of the displayed picture.

OBJECTS AND SUMMARY OF THE INVENTION

Accordingly, it is an object of this invention to provide a digital scan converter which can prevent the appearance of the blanking period on a picture displayed on a video screen due to a jitter component.

It is another object of this invention to provide a digital scan converter, as aforesaid, suitable for use with a high definition television receiver.

According to one aspect of the present invention, there is provided a digital scan converter comprising means for converting an input composite video signal to red, green and blue analog primary color signals; an analog-to-digital converter for converting the red, green and blue analog primary color signals to red, green and blue digital primary color signals, respectively; memory means for storing the red, green and blue digital primary color signals; means for controlling writing of the red, green and blue digital primary color signals in said memory means; means for controlling reading of the red, green and blue digital primary color signals from the memory means at a reading speed faster than the writing speed; a digital-to-analog converter for converting the red, green and blue digital primary color signals read from the memory means to scan-converted red, green and blue analog primary color signals; means for separating synchronizing signals from the input composite video signal; clock signal generating means synchronized with synchronizing signals separated from the input composite video signal for supplying clock signals to the means for controlling writing and reading; means for generating horizontal blanking signals synchronized with output signals of the means for controlling writing; means for generating vertical blanking signals synchronized with synchronizing signals supplied from the synchronizing signal separating means; and means for generating composite blanking signals from the horizontal blanking signals and vertical blanking signals.

The above, and other objects, features and advantages of the present invention, will become apparent from the following detailed description of a preferred embodiment which is to be read in conjunction with the accompanying drawings, wherein like reference numerals designate corresponding elements and parts.

DESCRIPTION OF A PREFERRED EMBODIMENT

Figure 1:
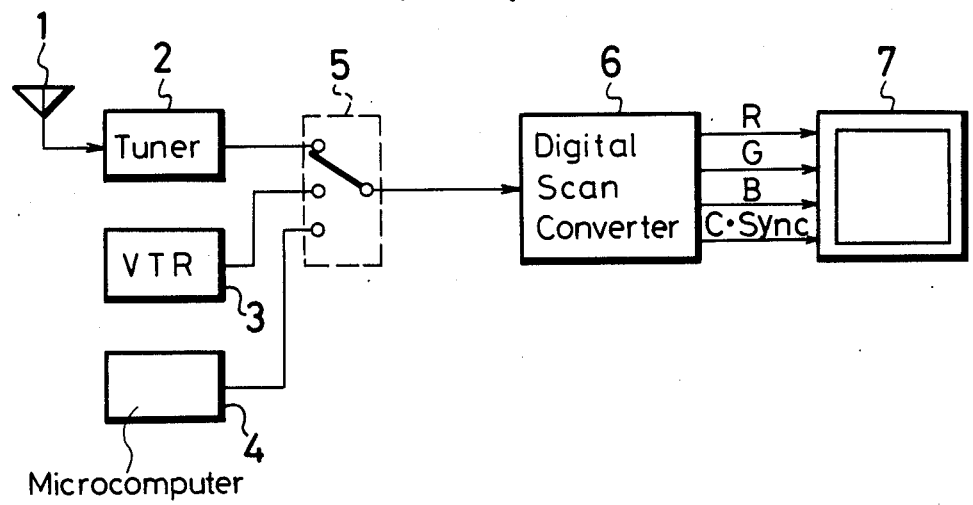
FIG. 1 is a block diagram showing an example of a prior art video display system which employs a digital scan converter.

Before proceeding with a detailed description of this invention, reference will be made to FIG. 1 of the drawings as showing an example of a video display system which uses a digital scan converter, and in which an antenna 1 receives broadcast television signals. The broadcast television signals received by antenna 1 are supplied to, and demodulated by a tuner 2 to provide a composite video signal. This composite video signal is fed to one input of an input selector circuit 5 which, at the other inputs thereof, is also supplied with composite video signals from a VTR (video tape recorder) 3 and from a microcomputer 4. The composite video signal selected by input selector circuit 5 is supplied to a digital scan converter 6. In digital scan converter 6, the selected input composite video signal is converted to scan-converted red, green and blue primary color signals R,G and B. The scan-converted red, green and blue primary color signals R,G and B, together with a composite synchronizing signal C and a scan-converted composite synchronizing signal SYNC are supplied to a monitor or receiver 7 so that a picture of relatively high definition can be displayed on the video screen of the monitor or receiver 7.

It has been proposed, for example, as disclosed in detail in our U.S. patent application Ser. No. 802,187, filed Nov. 25, 1985, and which has a common assignee herewith, that the digital scan converter 6 in the video display system of FIG. 1 may have an input terminal 11 which receives the composite color video signal according to the NTSC or other standard television system and, as shown on FIG. 2, applies the composite color video signal to a luminance/chrominance (Y/C) signal processor circuit 12 which generates standard red, green and blue analog primary color signals R,G and B. The red, green and blue analog primary color signals R,G and B are supplied to an A/D (analog-to-digital) converter 13 and thereby converted to red, green and blue digital primary color signals. The red, green and blue digital primary color signals from A/D converter 13 are supplied to a memory 14 in which the scan conversion process is carried out to double or otherwise increase the number of the horizontal scanning lines. The resulting scan-converted red, green and blue digital primary color signals from memory 14 are supplied to a D/A (digital-to-analog) converter 15 in which they are converted to scan-converted red, green and blue analog primary signals, 2·R, 2·G and 2·B which are delivered to respective output terminals 16.

The composite video signal applied to input terminal 11 is also supplied to a deflection IC (integrated circuit) 21 which generates a horizontal synchronizing pulse $S_H$ supplied to one input of an AFC (automatic frequency control) circuit 22, and a VCO (voltage controlled oscillator) 23 is controlled by an output signal from AFC circuit 22. The output signal from VCO 23 is supplied to a writing address counter 24 and a reading address counter 25 which act as frequency dividers, and the resulting writing and reading address signals therefrom are selectively supplied through a selector 26 to memory 14 for controlling the writing in, and the reading from the memory. The address signal from reading address counter 25 is also supplied to a synchronizing signal generator circuit 27 which then generates a horizontal synchronizing pulse $S_H$ synchronized with the reading address counter 25 and supplies the same to another input of AFC circuit 22. Thus, the composite input video signal and the address signal are synchronized with each other. Also, synchronizing signal generator circuit 27 generates a scan-converted composite synchronizing signal 2C·SYNC whose horizontal frequency is twice the normal or standard horizontal frequency and whose vertical frequency is a standard frequency. This scan-converted composite synchronizing signal 2C·SYNC is delivered to an output terminal 28.

Figure 2:
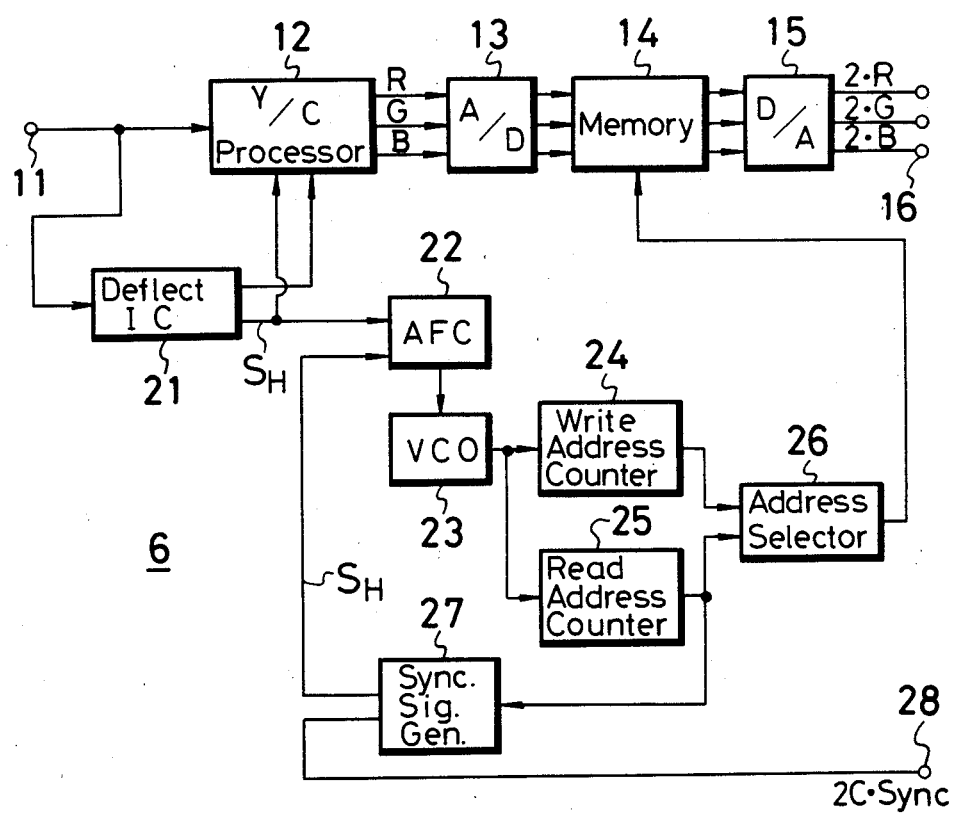
FIG. 2 is a block diagram showing an example of a digital scan converter with a conventional arrangement for providing composite blanking signals.

In accordance with conventional practice, in the digital scan converter shown in FIG. 2, the blanking of the red, green and blue primary color signals generated from the Y/C processor circuit 12 is carried out by using a composite blanking signal derived from deflection IC 21. This composite blanking signal is conventionally generated by another AFC circuit (not shown) incorporated in deflection IC 21. In that case, problems will arise, for example, upon occurrence of a jitter component of the AFC circuit incorporated in deflection IC 21.

More specifically, in the digital scan converter having its composite blanking signal provided from deflection IC, as shown on FIG. 2, AFC circuit 22, which is used to control generation of the address signals for memory 14, and the other AFC circuit incorporated in deflection IC 21 are not synchronized with each other. As a result, a case may be encountered in which the jitter components of these AFC circuits appear to be multiplied with each other. By reason of the foregoing, the blanking periods of the red, green and blue primary color signals enter or at least partly coincide with writing address periods of memory 14 so that the blanking period is displayed on the screen of the CRT as a black area at the left end or right end of the displayed picture.

The foregoing problem is avoided by a digital scan converter according to the present invention which is hereinafter described with reference to FIG. 3, and in which parts corresponding to those described with reference to FIG. 2 are identified by the same reference numerals and will not be described in detail.

Figure 3:
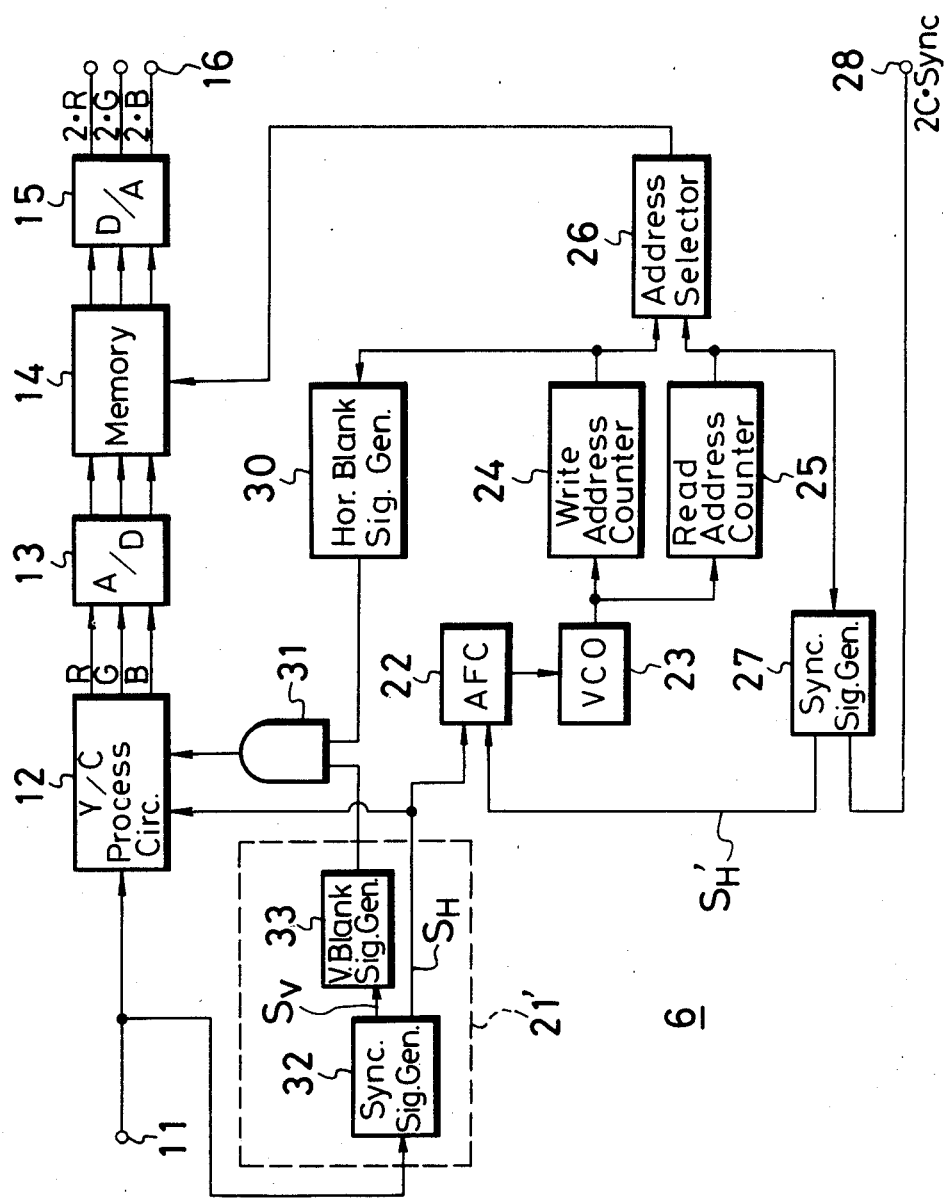
FIG. 3 is a block diagram showing an embodiment of a digital scan converter according to the present invention.

More specifically, in the embodiment of FIG. 3, deflection IC 21' includes a synchronizing signal separating circuit 32 which is adapted to separate a vertical synchronizing signal $S_V$ and a horizontal synchronizing signal $S_H$ from the input composite video signal. The vertical synchronizing signal $S_V$ is supplied to a vertical blanking signal generating circuit 33 also included in deflection IC 21'.

Further, the address signal from writing address counter 24 is supplied to a horizontal blanking signal generator circuit 30 which generates a horizontal blanking signal synchronized with the write address signal. The horizontal blanking signal from the horizontal blanking signal generator circuit 30 and the vertical blanking signal from the vertical blanking signal generator circuit 33 are both supplied to an AND circuit 31. The output or composite blanking signal from AND circuit 31 is supplied to Y/C processor circuit 12 to control the blanking of the primary color signals R,G and B therein. Other circuit elements are connected similarly to the like-numbered elements on FIG. 2. Thus, the horizontal synchronizing signal $S_H$ separated from the input composite video signal by separator 32 in deflection IC 21 is applied to one input of AFC circuit 22 for phase comparison in the latter with the horizontal synchronizing signal $S'_H$ provided by synchronizing signal generator in synchronism with the read address output of counter 25. The VCO 23 which provides the clock signals counted by write and read address counters 24 and 25, is, in turn, controlled by the phase comparison in AFC 22.

As in the earlier described digital scan converter, the scan-converted red, green and blue primary color signals 2·R, 2·G and 2·B and the scan-converted synchronizing signal 2C SYNC are developed at the output terminals 16 and 28, respectively, of the embodiment shown on FIG. 3. However, in the digital scan converter according to the present invention, the blanking of the red, green and blue primary color signals R,G and B from the Y/C processor circuit 12 is synchronized with the address signals of the memory 14, so that the blanking position within the memory 14 is fixed. Thus, when the scan-converted output signal is displayed on a video screen, the blanking period can be prevented from appearing on the picture displayed on the video screen. Even though the jitter component of the AFC circuit 22 may remain, the operation is inherently digital so that the amount of the jitter component is very small. Furthermore, since the scan-converted synchronizing signal is formed on the basis of the output from VCO 23, the blanking period can be prevented from appearing on the picture displayed on the video screen by reason of the jitter component of AFC circuit 22.

Consequently, in the digital scan converter according to this invention, since the blanking of the input video signal is effected in synchronism with the address signal of memory 14, even if jitter occurs in the AFC circuit, the blanking period can be prevented from appearing on the picture displayed on the video screen.

Although the above digital scan converter according to the invention generates the vertical blanking signal by means of the vertical blanking signal generator circuit 33 on the basis of the vertical synchronizing signal separated from the input composite video signal, the vertical blanking signal may be generated by another vertical blanking signal generator circuit synchronized with the writing address counter 24. In that case, the blanking is carried out more accurately. However, since the vertical blanking is rough as compared with the jitter component of the AFC 22, no trouble will occur even when the vertical blanking signal is not controlled from the writing address counter 24.

Although a single preferred embodiment of the invention has been described with reference to the drawings, it will be apparent that many modifications and variations could be effected therein by one skilled in the art without departing from the spirit or scope of the invention as defined in the appended claims.

We claim:

1. A digital scan converter comprising:
   means for converting an input composite video signal to red, green and blue analog primary color signals;
   analog-to-digital converter means for converting said red, green and blue analog primary color signals to red, green and blue digital primary color signals, respectively;
   memory means for storing said red, green and blue digital primary color signals;
   means for controlling writing of said red, green and blue digital primary color signals in said memory means at a predetermined writing speed;
   means for controlling reading of said red, green and blue digital primary color signals from said memory means at a reading speed faster than said writing speed;
   digital-to-analog converter means for converting said red, green and blue digital primary color signals read from said memory means to scan-converted red, green and blue analog primary color signals;
   means for separating synchronizing signals from said input composite video signal;
   clock signal generating means synchronized with synchronizing signals separated from the input composite video signal for supplying clock signals to said means for controlling writing and said means for controlling reading;
   means for generating horizontal blanking signals synchronized with output signals of said means for controlling writing;
   means for generating vertical blanking signals synchronized with synchronizing signals from said synchronizing signal separating means; and
   means for generating composite blanking signals from said horizontal blanking signals and said vertical blanking signals.

2. A digital scan converter according to claim 1; wherein said means for separating synchronizing signals provides horizontal synchronizing signals and vertical synchronizing signals, said vertical blanking signals are synchronized with said vertical synchronizing signals, and said clock signal generating means are synchronized with said horizontal synchronizing signals from said means for separating.

3. A digital scan converter according to claim 2; wherein said means for controlling writing and said means for controlling reading include writing address counter means and reading address counter means, respectively.

4. A digital scan converter according to claim 3; further comprising synchronizing signal generating means for supplying horizontal synchronizing signals synchronized with said reading address counter, and automatic frequency control means for controlling said clock signal generating means, said automatic frequency control means being synchronized with said horizontal synchronizing signals supplied from said synchronizing signal generating means and with said horizontal synchronizing signals from said separating means.

5. A digital scan converter according to claim 4; wherein said synchronizing signal generating means also produces composite synchronizing signals synchronized with an output of said reading address counter means.

6. A digital scan converter according to claim 5; further comprising selector means for selectively supplying output signals of said writing address counter means and said reading address counter means to said memory means.

7. A digital scan converter according to claim 6; wherein said reading speed of said reading address counter means is twice the speed of said writing speed of said writing address counter means.

8. A digital scan converter according to claim 6; wherein said composite blanking signal generating means is an AND circuit having inputs receiving said horizontal and vertical blanking signals, respectively.

* * * * *